United States Patent
Trebbi et al.

(10) Patent No.: US 11,420,778 B2
(45) Date of Patent: Aug. 23, 2022

(54) MACHINE FOR FILLING AND PACKAGING BOTTLES, CARTRIDGES, SYRINGES

(71) Applicant: I.M.A. INDUSTRIA MACCHINE AUTOMATICHE S.P.A., Ozzano dell'Emilia (IT)

(72) Inventors: Claudio Trebbi, Medicina (IT); Gabriele Gabusi, Castenaso (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 879 days.

(21) Appl. No.: 16/321,450

(22) PCT Filed: Aug. 1, 2017

(86) PCT No.: PCT/EP2017/069461
§ 371 (c)(1),
(2) Date: Jan. 28, 2019

(87) PCT Pub. No.: WO2018/024737
PCT Pub. Date: Feb. 8, 2018

(65) Prior Publication Data
US 2021/0292014 A1    Sep. 23, 2021

(30) Foreign Application Priority Data
Aug. 3, 2016  (IT) .................. 102016000081444

(51) Int. Cl.
*B25J 9/00*    (2006.01)
*B65B 3/00*    (2006.01)
(Continued)

(52) U.S. Cl.
CPC ............. *B65B 3/003* (2013.01); *B25J 9/0096* (2013.01); *B25J 15/009* (2013.01); *B25J 15/0608* (2013.01)

(58) Field of Classification Search
CPC ..... B25J 9/0096; B25J 15/009; B25J 15/0608
(Continued)

(56) References Cited

U.S. PATENT DOCUMENTS 9,351,569 B1 * 5/2016 Lucey .................. B23P 21/002
2010/0018330 A1   1/2010 Marty et al.
(Continued)

FOREIGN PATENT DOCUMENTS

| JP | H06206134 A | 7/1994 |
| JP | 2004158658 A | 6/2004 |
| JP | 2016030320 A | 3/2016 |

OTHER PUBLICATIONS

International Search Report and Written Opinion for PCT/EP2017/069461, dated Nov. 6, 2017.

*Primary Examiner* — Gerald McClain
(74) *Attorney, Agent, or Firm* — Marshall, Gerstein & Borun LLP

(57) ABSTRACT

A machine for filling and packaging containers including but not limited to bottles, cartridges, and syringes includes a wall that delimits an operating chamber in which at least one handling arm is arranged and which is facing at least one station placed externally to the operating chamber for the treatment of one or more of the containers. An intermediate element includes at least one coupling member configured to be alternatively operatively associable to the station and to the handling arm, with the intermediate element further including a coupling assembly integral to the intermediate element itself and different than coupling member. The coupling assembly is configured to removably hold one or more of the containers to be treated.

13 Claims, 6 Drawing Sheets

(51) Int. Cl.
 *B25J 15/00* (2006.01)
 *B25J 15/06* (2006.01)
(58) Field of Classification Search
 USPC .......................................................... 464/29
 See application file for complete search history.

(56) References Cited

U.S. PATENT DOCUMENTS

| | | |
|---|---|---|
| 2011/0208350 A1 | 8/2011 | Eliuk et al. |
| 2016/0052148 A1* | 2/2016 | Shi .................. B25J 15/009 29/559 |
| 2018/0036889 A1* | 2/2018 | Birkmeyer ........... B25J 11/0085 |

* cited by examiner

MACHINE FOR FILLING AND PACKAGING BOTTLES, CARTRIDGES, SYRINGES

BACKGROUND OF THE INVENTION

Field of the Invention

The present invention relates to a machine for filling and packaging bottles, cartridges, syringes and the like.

Related Technology

In the pharmaceutical field, products and substances that are in liquid and/or powder form can be validly packaged in dedicated containers, often suitable for containing a single dose, for the purposes of facilitating the patient administration operations thereof.

These products and substances are therefore packaged in specific bottles, vials, cartridges (such as for example the carpules used in syringes intended for local anaesthetic administrations), syringes (such as the ready-to-use syringes used for numerous and heterogeneous applications), and the like.

The known procedures for the filling and packaging of containers such as bottles, cartridges, syringes and the like provide for the provisions of tubs that house appropriate nests in which the individual containers are neatly arranged. The tubs, the nests and the containers are of the standard type, produced by the relative suppliers, generally other than those that deal with filling, and constitute the first dimensional and structural constraint that must be imposed upon the filling and closing machine.

Machines of the known type provide for collecting the nest, in which a plurality of empty and sterile containers are stacked, from the relative tube and the transfer thereof into an operative zone at which to collect at least one individual container at a time, fill it with a specific substances and close its opening to isolate the contents from the external environment.

Handling of the nests is normally carried out by a multiaxis handling apparatuses that collect them from a respective conveyor belt to transfer them, from time to time, to a specific operative station (where the filling or weighing or closure, etc. will be performed).

This type of apparatus is however not generally very versatile, while it would be necessary to be able to quickly adapt them to nests and containers of a different form (for example having different dimensions, different sizes or shapes according to other standards).

In general, it is preferable to collect all the containers housed in the same row of the nest, in order to perform the various operations to which they must be quickly and simply subjected.

It is thus necessary that the machine can be adapted to the form of the nests in use, in order to optimise the efficiency thereof.

The possibility of replacing some intermediate elements (produced according to a specific form) with others that are suitably shaped for managing a different form is therefore envisaged.

The change of form procedures entail a number of problems, firstly the need for the direct intervention of an operator who will take care of removing the intermediate element concerning a specific form of nest and fitting a different intermediate element concerning a different form of nest.

This will entail a rather lengthy downtime and the need for a subsequent interior sanitising step of the machine, which, having to perform the dosage of medicinal products, must necessarily be free of any risk of contamination from the external environment.

It is clear that the traditional change of form procedures are lengthy and complex, and generating contamination of a machine's operating chamber, entail subsequent sanitising procedures.

SUMMARY OF THE INVENTION

The main aim of the present invention is to solve the aforementioned problems by proposing a machine for filling and packaging bottles, cartridges, syringes and the like that allows the change of form procedures to be performed without the intervention of an operator.

Within this aim, one object of the invention is to provide a machine for filling and packaging bottles, cartridges, syringes and the like that is not subjected to contamination, by the operator in particular, during the change of form procedures.

Another object of the invention is to provide a machine for filling and packaging bottles, cartridges, syringes and the like with rapid change of form and therefore suitable for maintaining high productivity of the plant in which the machine operates.

A further object of the present invention is to provide a machine for filling and packaging bottles, cartridges, syringes and the like that is cost-effective, of relatively simple practical embodiment and safe implementation.

This aim and these objects are achieved by a machine for filling and packaging bottles, cartridges, syringes and the like, in accordance with claim 1 of the present invention.

BRIEF DESCRIPTION OF THE DRAWINGS

Further features and advantages of the invention will become more apparent from the description of a preferred but non-exclusive embodiment of the machine for filling and packaging bottles, cartridges, syringes and the like, according to the invention, illustrated by way of a non-limiting example in the accompanying drawings, in which.

DETAILED DESCRIPTION

Figure 1:
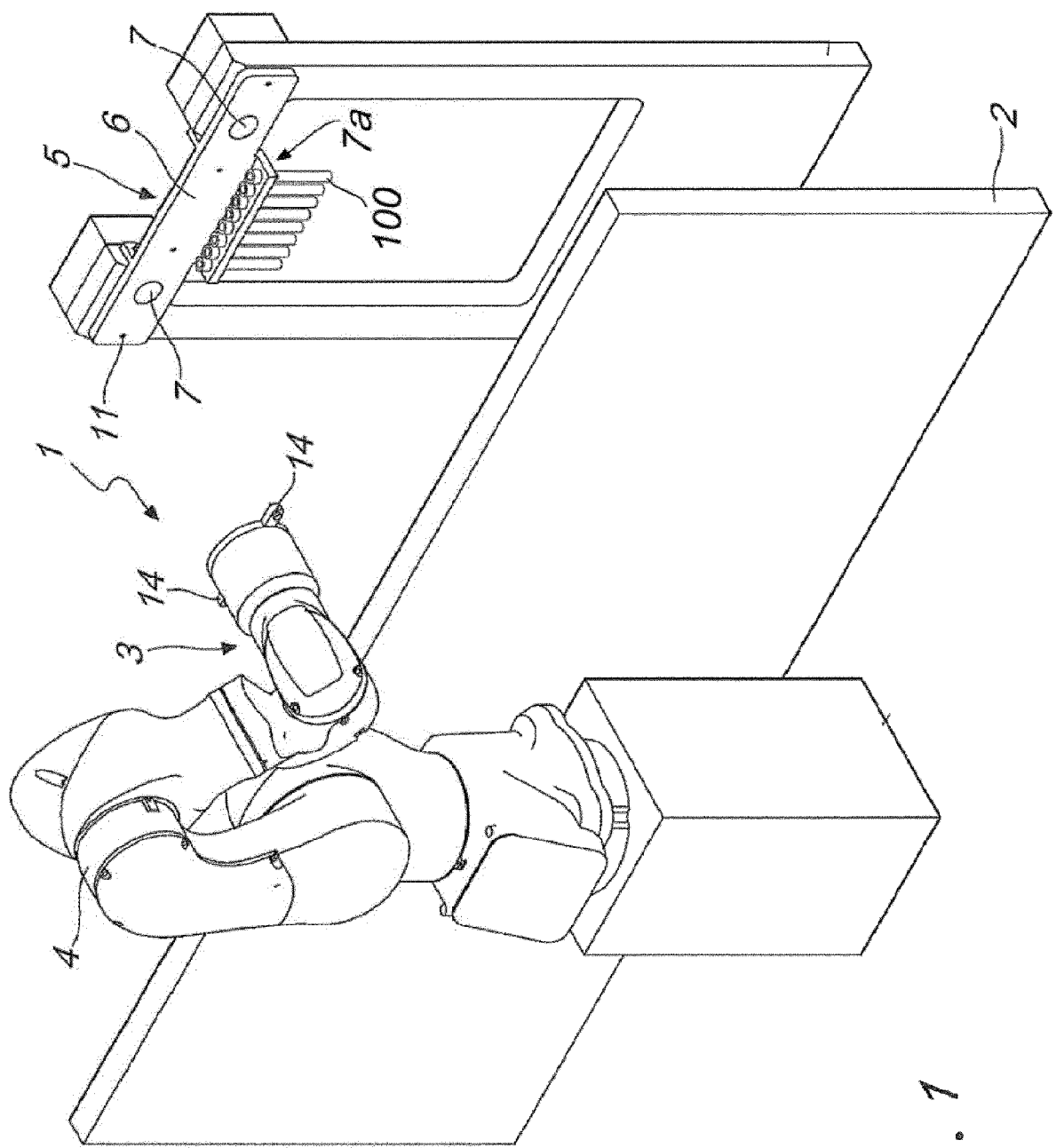
FIG. 1 schematically depicts an axonometric view of a machine for filling and packaging bottles, cartridges, syringes and the like according to the invention in a first configuration.
Figure 2:
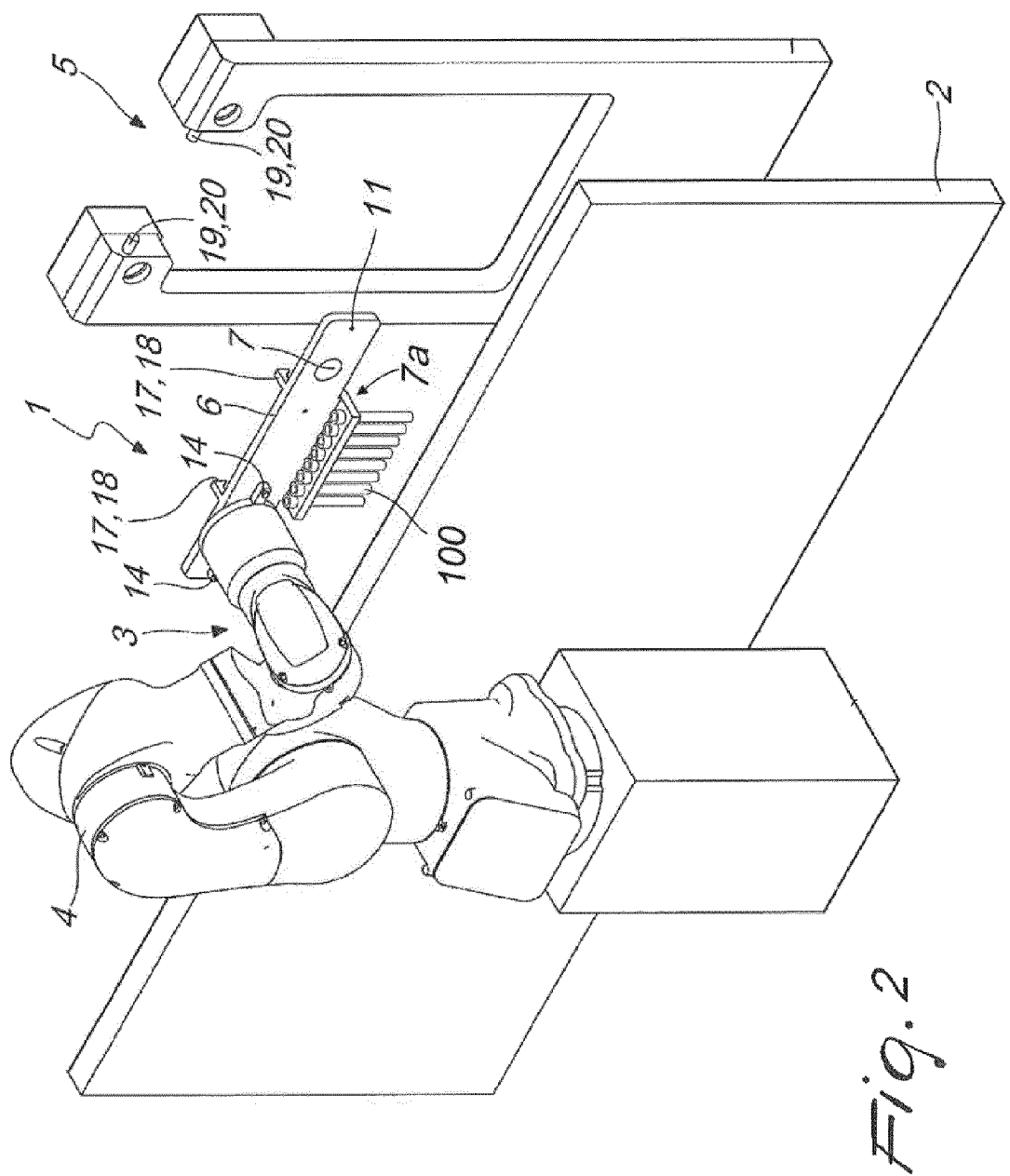
FIG. 2 schematically depicts the machine of FIG. 1 in a second configuration.
Figure 3:
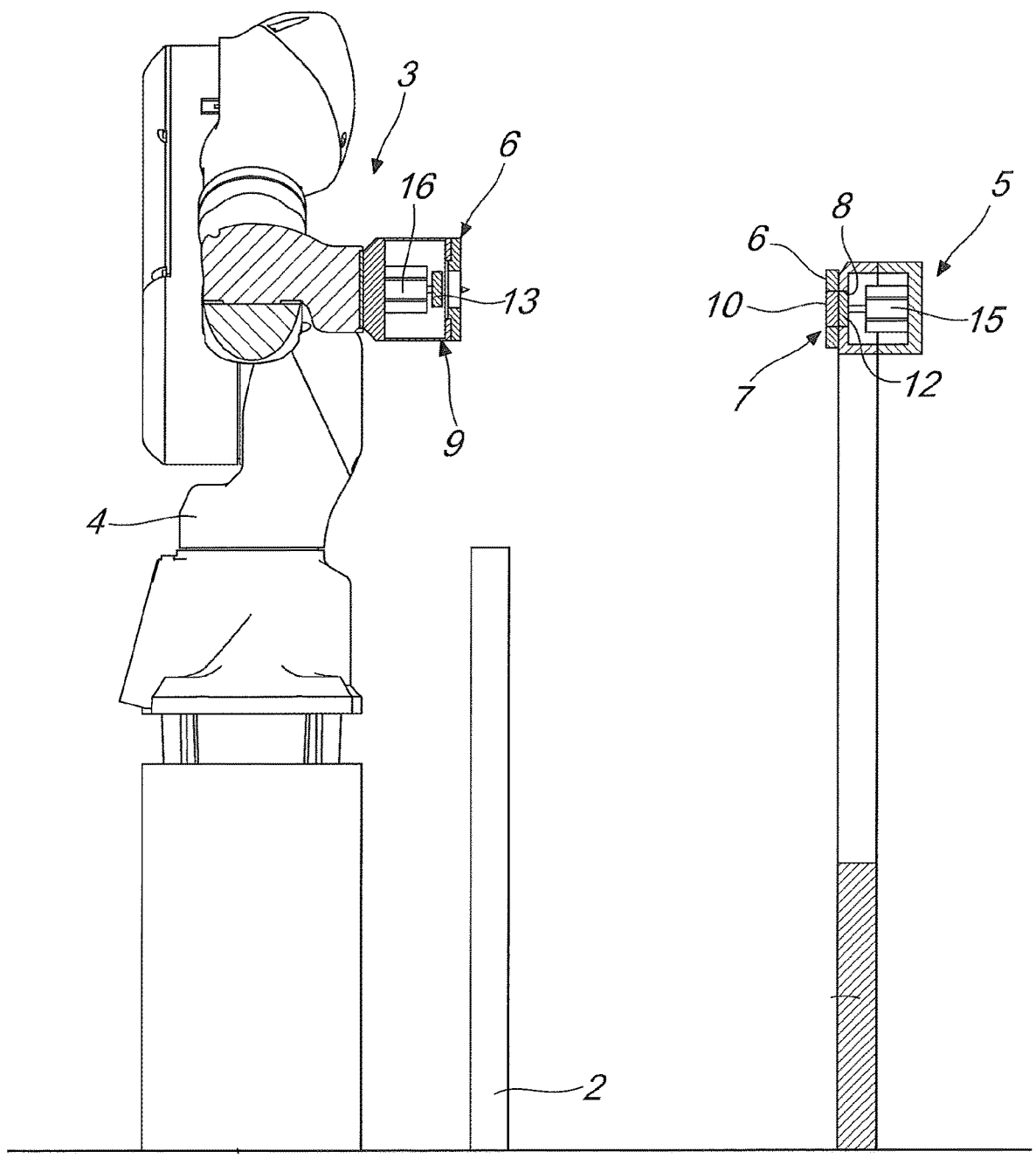
FIGS. 3-6 depict a respective side view, partially in cross-section, of one part of the machine of FIG. 1 in different operational phases.
Figure 4:
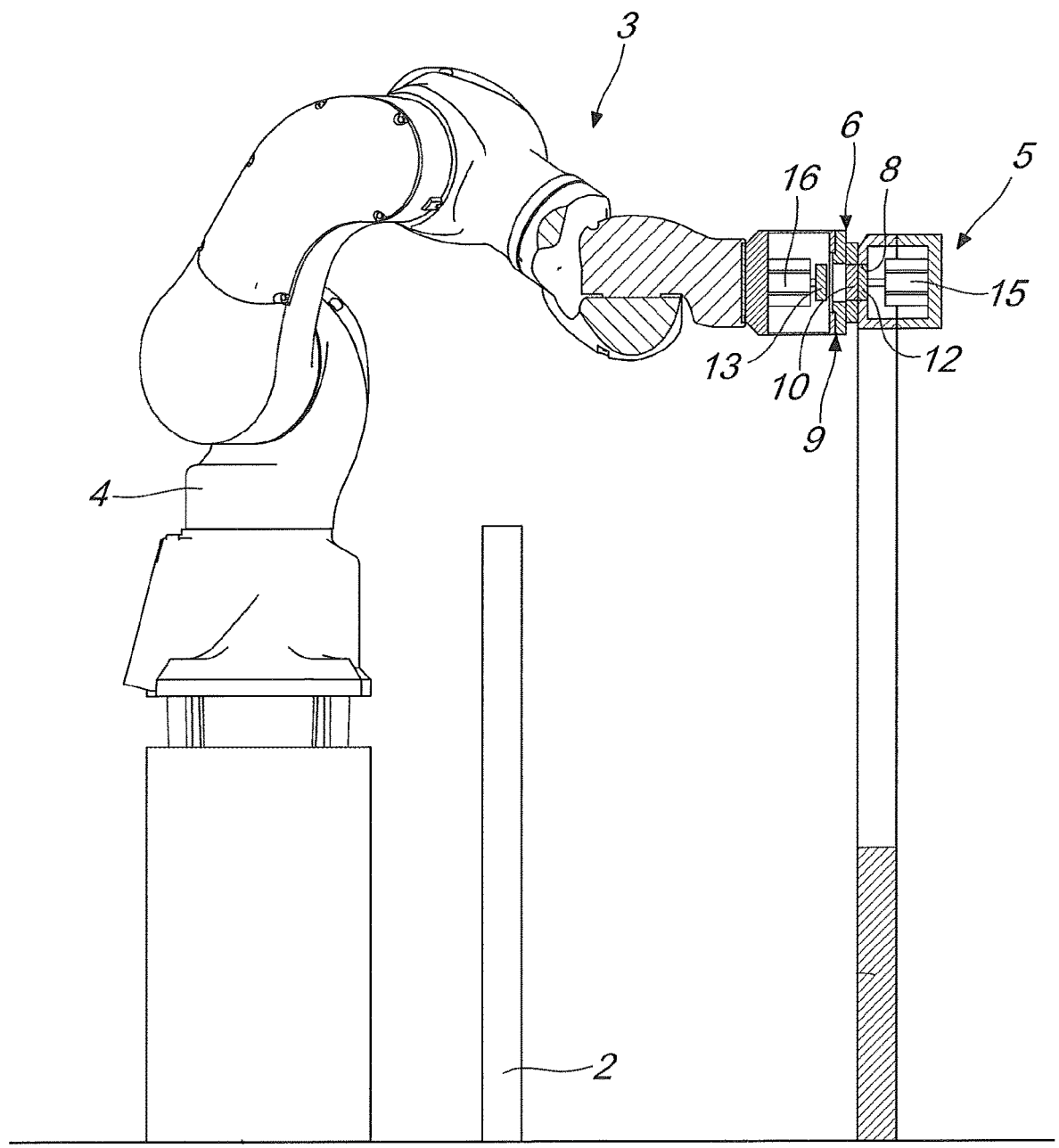
Figure 5:
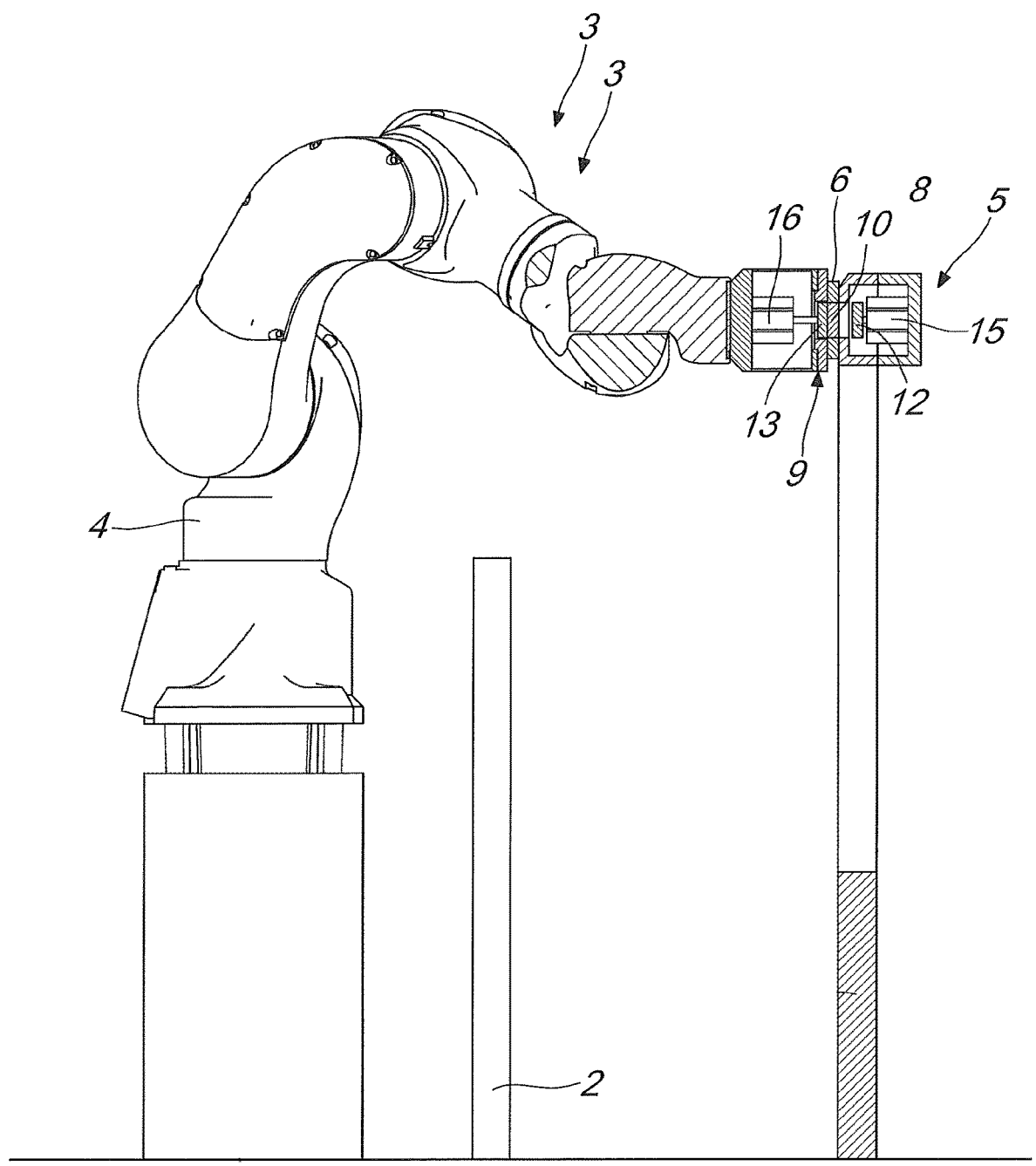
Figure 6:
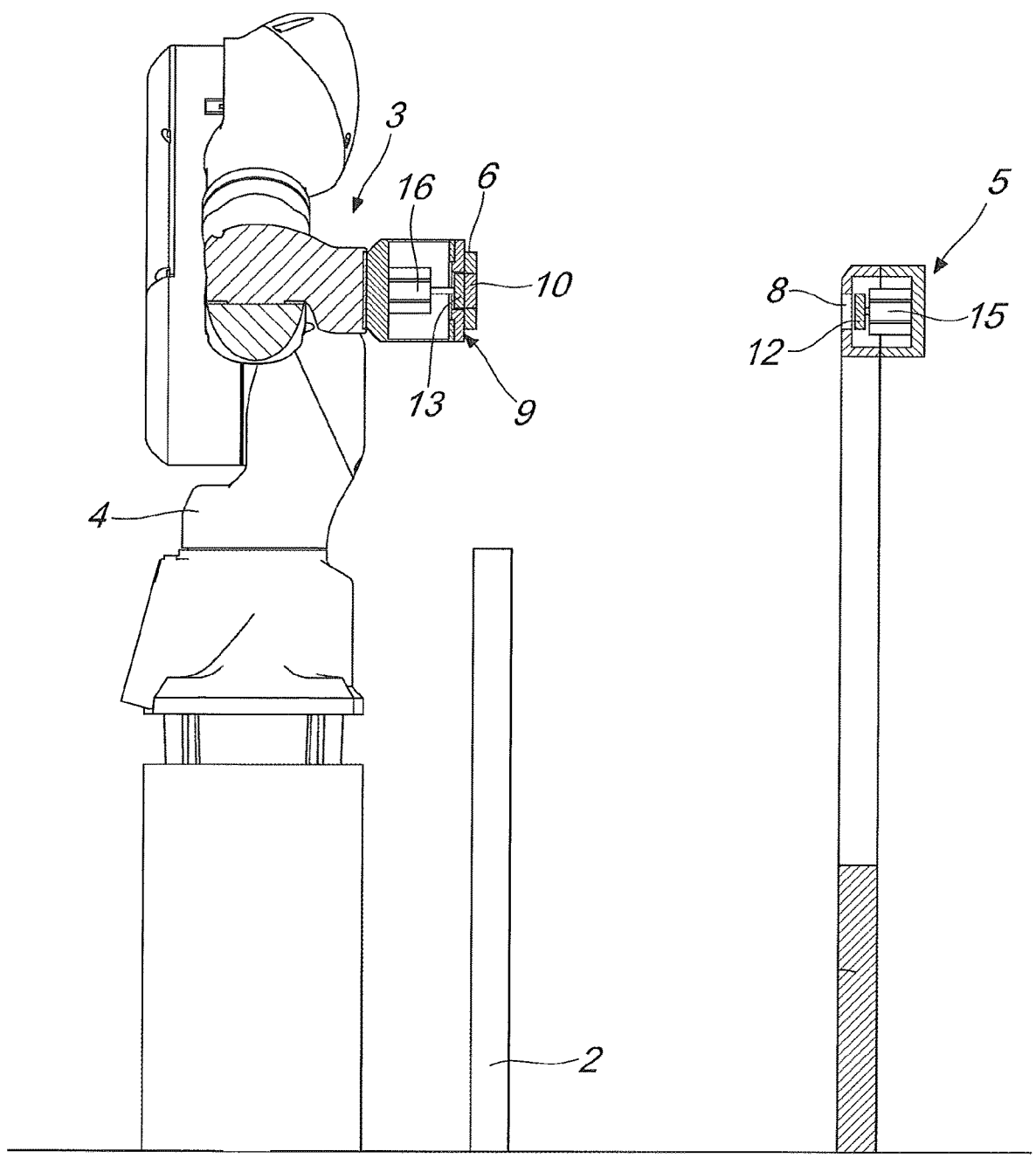

With particular reference to these figures, a machine for filling and packaging bottles, cartridges, syringes and the like is globally indicated by 1.

The machine 1 according to the invention comprises a wall 2 that separates an operating chamber 3 in which at least one handling arm 4 is arranged, from a treatment chamber in which is placed at least one station 5 for the treatment of at least one container 100 preferably selected from bottles, cartridges, syringes and the like. The handling arm 4 substantially faces the station 5 from above the wall 2.

In order to treat (e.g. filling, weighing, capping, crimping, etc.) different type of containers, it is necessary that the station 5 can be adapted to the form of the containers.

Each container can in fact be produced with different forms (consider the form difference found in bottles, carpules, syringes, vials, cartridges and the like) and/or with different sizes and therefore, for the proper handling thereof and for operating interventions thereon, it is necessary that the machine 1 be suitably adapted to these parameters.

Secondly, the containers to be treated are collected housed in a nest. This nest can have different form.

It is therefore apparent that numerous parts of the machine 1 will be liable to modifications, in order to adapt the machine 1 to the different type of containers to be treated.

According to the present invention, the machine comprises an intermediate element 6.

The intermediate element 6 will be alternatively operationally associable to the station 5 (allowing a predefined treatment on a predefined number of specific containers) and to the handling arm 4 (which, as will become clearer below, will perform the actual change of form procedures).

The intermediate element 6 comprises, on at least one portion thereof, at least one first coupling member 7 of form and size conjugated to that of at least one second coupling member 8 integral to the station 5 and to that of a third coupling member 9 integral to the handling arm 4 so as to be alternatively operatively associable to the station 5 and to the handling arm 4.

The intermediate element 6 further comprises coupling means 7a, integral to the intermediate element 6, differing from the first coupling member 7 and configured to removably be coupled to and hold the at least one container 100 to be treated.

We have thus seen how it is possible to replace the intermediate elements 6 (each of which relates to a specific form of nest and/or containers) on the handling arms 4 without the assistance of an operator. The intermediate elements 6 that are to be replaced are stacked directly inside the machine 1 (in a zone that has been suitably sanitised and wherein the presence of particles and/or other contaminants has been minimised). The handling arm 4 comprises the third coupling member 9 for holding the respective intermediate element 6 (which is in turn provided with the first coupling member 7). The exchange of the intermediate element 6 takes place in a predetermined position. The replacement of the intermediate elements 6 can be performed very quickly and efficiently; when an intermediate element 6 is removed it can be placed in a tray resting on a conveyor belt on which the tubs and the nests are conveyed passing through the machine 1. In this way it is possible to feed into the machine 1 empty tubs on which the removed intermediate elements 6 are housed before exiting the machine 1. It is therefore possible to proceed with the cleaning and sanitising of the machine 1, feeding into the machine (along the same belt mentioned previously) other trays containing intermediate elements 6 of different form.

The handling arms 4 will collect these intermediate elements 6 and will provide for their delivery and coupling to the respective mechanical assemblies.

With particular reference to an embodiment of certain practical and application interest, the first coupling member 7 can conveniently comprise at least one core made of a material preferably selected from ferromagnetic material and magnetic material and at least one alignment unit 11.

The first coupling member 7 made of a preferably ferromagnetic or magnetic material constitutes a simple and functional applicative version of the present invention, the possibility of using mechanical or electrical coupling members of a different type is not however excluded.

Similarly, once again with reference to the embodiment mentioned in the previous paragraph, the second coupling member 8 and the third coupling member 9 can preferably comprise at least one block 12, 13 (block 12 belonging to the second coupling member 8 and block 13 belonging to the third coupling member 9) made of a material preferably selected from ferromagnetic material and magnetic material.

At least one between the second coupling member 8 and the third coupling member 9, shall further comprise at least one respective alignment body 14 with form and size conjugated to that of the alignment unit 11 of the first coupling member 7. When the alignment body 14 and the alignment unit 11 are in the reciprocal coupling configuration, these are juxtaposed (with particular reference to the accompanying drawings the alignment body 14, protruding from the third coupling member 9 will be introduced into the alignment unit 11, constituted by a corresponding recess of the second coupling member 8), while the core 10 is facing and close to the block 12 of the second coupling member 8 or to the block 13 of the third coupling member 9.

According to an embodiment of the present invention, the at least one block 12 or 13, made of material preferably selected from ferromagnetic material and magnetic material, of one of the second and third coupling members 8, 9 is slidable in a forward/backward direction with respect to the first coupling member 7. A surface of the coupling member 7 is aligned to the core 10 of the first coupling member 7, thus ensuring magnetic coupling/uncoupling therebetween.

In order to allow easy transfer of the intermediate element 6 from the arm 4 to the station 5, the second coupling member 8 and the third coupling member 9 are provided with a respective actuator 15, 16 each supporting at least the corresponding block 12, 13 for the movement of the at least one block 12, 13 in the forward/backward direction with respect to the first coupling member 7.

With reference another embodiment, each core 10 is made of ferromagnetic material, while the blocks 12 and 13 will be made of magnetic material (blocks 12 and 13 are therefore permanent magnets).

The use of blocks 12 and 13 made of permanent magnets is particularly advantageous since it allows the magnetic attraction exerted thereby on the core 10 (which, being made of ferromagnetic material, is subject to this attraction) without requiring any additional source of power supply.

Alternatively the core 10 could however be made of ferromagnetic material, while the blocks 12 and 13 should be constituted by electromagnets.

It is however observed, in this case, that the electromagnets would require electrical power to exercise attraction on the core 10 and also therefore in the static configurations in which the intermediate element 6 is firmly coupled to the station 5, there would be a power consumption to ensure the permanence of the magnetic attraction on the core 10 itself.

The actuator 15, 16 is preferably of the type selected from pneumatic actuator, hydraulic actuator and electric actuator of the type preferably selected from single-acting and double-acting.

In order to identify all the aspects of the present invention, it is specified that the alignment units 11 can be seats of form and size complementary to those of the alignment bodies 14.

In the coupling configuration of the at least one intermediate element 6 with the station 5 and/or with the handling arm 4, the alignment units 11 will house the alignment bodies 14.

One of the most important advantages found with the use of the machine 1 according to the invention lies in the possibility of performing the change of form without any operator intervention and without the possibility of the occurrence of any contamination of the operating chamber 3 of the machine 1.

For this reason the machine 1 will advantageously comprise, inside the operating chamber, a stack of a plurality of distinct intermediate elements 6 having different forms.

A free end of the handling arm 4 provided with the aid at least one block (13) is movable between a first configuration of alignment and substantial juxtaposition to one of the intermediate elements 6 of the stack, to a second configuration of alignment and substantial juxtaposition to the intermediate element 6 coupled to the at least one station 5 for the treatment of the container 100.

This means that the arm 4 will be able to take an intermediate element 6 from the station 5 and place it in the stack.

Similarly, the arm 4 will be able to take an intermediate element 6 from the stack, to transfer it and couple it to the station 5.

It is also specified that the at least one intermediate element 6 has at least one respective engaging element 17, 18 that can be removably coupled to at least one corresponding abutment 19, 20 of the station 5.

The engaging elements 17, 18 can be shaped as hooks or as shoulders. The abutments 19, 20 will, on the other hand, generally consist of protruding pins or pegs.

According to a generic version of machine 1 according to the invention, as first coupling member 7, second coupling member 8 and third coupling member 9 can be used suction cups connected to a respective suction circuit, intercepted by solenoid valves operated by a respective control unit.

This last embodiment also allows the arm 4 to remove and couple different intermediate elements 6 to the station 5 (thus achieving a change of form) without the need for any intervention by operators.

Alternatively, as first coupling member 7, second coupling member 8 and third coupling member 9 can be used grippers and protrusions.

Advantageously, the present invention solves the aforementioned problems by proposing a machine 1 for filling and packaging bottles, cartridges, syringes and the like that allows the change of form procedures to be performed without the intervention of an operator.

This has particularly interesting implications in relation to reducing the operating costs of the machine 1 with respect to those of the known type and to a greater ease of management of the change of form procedures (which are fundamental and indispensable for machines of this type).

Advantageously, the machine 1 according to the invention does not undergo contamination during the change of form procedures: indeed the stack of intermediate elements 6 of different form are housed in the operating chamber 3 of the machine 1 preventing any contamination from the outside environment (which could generate contamination) during the change of form procedures.

Positively, the machine 1 according to the invention allows automatic change of form procedures that are particularly rapid and therefore suitable for maintaining a high productivity of the plant in which the machine itself 1 operates.

Favourably, the machine 1 according to the invention is of relatively simple practical embodiment and of substantially contained costs: these features make the machine 1 according to the invention an innovation of certain application.

The invention thus devised is susceptible to a number of modifications and variants, all of which fall under the inventive concept; moreover, all the details can be replaced by other technically equivalent elements.

In the example embodiments illustrated, individual features, reported in relation to specific examples, may in actual fact be interchanged with other different features that exist in other example embodiments.

In practice, any materials and any sizes may be used depending on requirements and the state of the art.

The invention claimed is:

1. A machine for filling and packaging containers, the containers including but not limited to bottles, cartridges, and, syringes, the machine comprising: a wall that separates an operating chamber in which at least one handling arm is arranged, from a treatment chamber in which is placed at least one station for the treatment of at least one of the containers, said at least one handling arm facing said at least one station comprising an intermediate element which comprises, on at least one portion thereof, at least one first coupling member of form and size conjugated to that of at least one second coupling member integral to said station, said first coupling member further of form and size conjugated to that of a third coupling member integral to said handling arm so as to be alternatively operatively associable to said station and to said handling arm, said intermediate element further comprising coupling means, integral to the intermediate element, differing from said first coupling member and being configured to be removably coupled to and hold said at least one container to be treated;

said at least one first coupling member including at least one core and at least one alignment unit, and wherein said second coupling member and said third coupling member include at least one block and at least one respective alignment body of form and size conjugated to said alignment unit;

wherein when in the coupled configuration said alignment body and said alignment unit are juxtaposed to each other and said core faces one of said at least one block of said second and third coupling members;

wherein said at least one block of one of said second and third coupling members is slidable in a forward/backward direction with resect to said first coupling member; and wherein said second coupling member and said third coupling member respectively comprise at least one actuator supporting one of said at least one block for moving said at least one block in the forward/backward direction with respect to said first coupling member.

2. The machine according to claim 1, wherein said at least one core is made of material preferably selected from ferromagnetic material and magnetic material, and wherein said at least one alignment unit and said at least one block of said second and third coupling members are made of material selected from ferromagnetic material and magnetic material.

3. The machine according to claim 2, wherein said at least one block of said second and third coupling members is made of material selected from ferromagnetic material and magnetic material.

4. The machine according to claim 2, wherein said blocks comprise electromagnets.

5. The machine according to claim 1, wherein said at least one intermediate element has at least an engaging element that can be removably coupled to at least a corresponding abutment of the station.

6. The machine according to claim 1, wherein said at least one actuator is pneumatic, hydraulic or electric.

7. The machine according to claim 1, wherein said alignment unit is a seat of complementary form and size to that of said alignment body, in the coupled configuration of said at least one intermediate element with said station and/or with said handling arm, said alignment units housing said alignment body.

8. The machine according to claim 1, comprising, within said operating chamber, a stack of a plurality of intermediate elements having different form, a free end of said handling arm provided with said at least one block being movable between a first configuration of alignment and substantial juxtaposition to one of said intermediate elements of said stack, to a second configuration of alignment and substantial juxtaposition to the intermediate element coupled to said at least one station for the treatment of the container.

9. A machine for filling and packaging containers, the containers including but not limited to bottles, cartridges, and syringes, the machine comprising:
- a wall that separates an operating chamber in which a handling arm is arranged, from a treatment chamber in which is placed a station for the treatment of at least one of the containers, the handling arm facing the station;
- the station comprising an intermediate element a portion carrying a first coupling member arranged to be couplable to a second coupling member integral to the station, the first coupling member further arranged to be couplable to a third coupling member integral to said handling arm, so that the first coupling member can be alternatively coupled to the station or to the handling arm, the intermediate element further including an integral holder for removably holding at least one of the containers;
- the first coupling member including a core and an alignment unit;
- the second coupling member and the third coupling member each including at least one associated block and at least one alignment body of configured to couple with the alignment unit of the first coupling member;
- wherein when in the coupled configuration the alignment body and the alignment unit are positioned relative to one another with the core facing the block of either the second coupling member or the third coupling member;
- wherein the block of the second and the third coupling members are slidable in a forward/backward direction with respect to said first coupling member; and
- wherein said second coupling member and said third coupling member respectively comprise at least one actuator supporting its associated block for moving its associated block in the forward/backward direction with respect to said first coupling member.

10. The machine according to claim 9, wherein the intermediate element has an engaging element that can be removably coupled to a corresponding abutment of the station.

11. The machine according to claim 9, wherein the core is made of ferromagnetic material and the blocks are made of magnetic material or are electromagnets.

12. The machine according to claim 9, wherein the actuator is pneumatic, hydraulic, or electric.

13. The machine according to claim 9, wherein said alignment unit is a seat and is arranged to engage the alignment body of either the second or third coupling member when in the coupled configuration.

* * * * *